United States Patent Office 2,970,917
Patented Feb. 7, 1961

2,970,917

WHIPPED MARGARINE AND PROCESS FOR MAKING THE SAME

Daniel Melnick, Teaneck, N.J., assignor to Corn Products Company, a corporation of Delaware No Drawing. Filed May 9, 1957, Ser. No. 658,011

18 Claims. (Cl. 99—122)

The present invention relates to a novel whipped margarine product, and also it relates to a novel method of preparing margarine products having exceptional plasticity, flavor and stability.

This application is a continuation-in-part of application Serial No. 356,319, filed May 20, 1953, now abandoned.

It is an object of the present invention to provide a novel whipped margarine having improved esthetic qualities including "mouthing" qualities, improved rate of flavor release, stability, bread coverage, resistance to mold growth, spreadability in the cold, resistance to "oiling off" at room temperature, frying properties and baking performance over conventional margarine.

Another object of the present invention is to provide a process for economically and efficiently producing margarine products.

Other objects of the invention will be apparent to those skilled in the art upon reading the specification which follows.

My whipped margarine is, so far as I am presently advise, a novel concept to the margarine industry. Whipped butter has been produced by the butter manufacturers for some time, but the whipped butter which they produce is nothing more than reworked butter, i.e., finished butter which has been subjected to vigorous, mechanical whipping treatment and packed in consumer-size paper tubs. The resulting butter product has the same oil composition, and the same mouthing qualities and rate of flavor release as the regular butter product from which it was made. In whipping the butter in air, as is the commercial practice, the vitamin A and flavor deterioration of the resulting whipped butter occurs at a more rapid rate than in regular butter. This prior art whipping process often produces a non-uniform dispersion of air into the product which may result in a non-uniformity in color, i.e., certain areas appear lighter in color than others in the same container. This detracts from the appearance of the product and consequently minimizes the sales appeal to the consumer. Whipped butter is at least as susceptible to mold contamination as regular butter. Indeed, the whipping of butter, which introduces air into the butter, has been condemned. Such whipped butter, because of the incidental contamination with microorganisms has inferior keeping qualities, for butter is particularly susceptible to hydrolytic rancidity catalysed by microorganisms. The publication of W. L. Davies in "Dairy Industries," volume 3, pages 171–3 (1938), should be noted in this respect.

Whipped butter is more spreadable at refrigeration temperatures than is regular butter; but at room temperature it is objectionably softer in texture. This disadvantage of whipped butter is apparently due to the fact that the stearine structure established when regular butter sets up is disrupted by whipping butter while it is in the solid or semi-solid state. There is apparently no difference in the baking performance of the butter before and after whipping.

From the discussion above, it is apparent that whipping butter in accordance with commercial practices possesses a number of undesirable results with respect to some of the properties of the butter regardless of other properties which may make whipped butter attractive to a segment of the consuming public. These disadvantages have undoubtedly played a great play in discouraging attempts to produce a whipped margarine.

As a result of an extensive research investigation, I have discovered that by whipping a uniform flowable margarine emulsion in accordance with the novel process of my invention, I obtain a novel whipped margarine which, surprisingly, is not inferior to regular margarine in any respect, such as is whipped butter when compared to regular butter. On the contrary, I have discovered that the preferred novel whipped margarine of my invention has none of the disadvantageous properties of whipped butter described above. In fact, the product of the invention appears to be a premium product, being generally superior and in no respect inferior to the regular margarine with which the prior art is familiar. The whipped margarine of the preferred embodiment of my invention using the preferred oils is superior to regular margarine in that it has improved "mouthing" qualities, rate of flavor release, stability, resistance to mold growth, spreadability in the cold, break coverage, resistance to "oiling off" at room temperature, frying properties and baking performance. These advantages will be described in further detail in the description which follows.

The whipped margarine of the present invention comprises margarine containing at least about 15% to about 40% by volume of finely and uniformly dispersed inert gas. The expression "inert" describing the gas introduced means that the gas will provoke no untoward effect upon the ingredients of the margarine during storage of the product. Thus, even air is regarded as an inert gas in the case of products held in the refrigerator. The term "whipped," as used in the present specification and the appended claims, is synonymous with "texturized," "plasticized" or "creamed." Margarine is basically an emulsion of plastic or spreadable fat and salted skim milk. In accordance with the U.S. Government regulations, margarine is an emulsion of 80% fat and 20% skim milk. Other ingredients such as emulsifiers and vitamins are added in minor concentrations for improvement of functional and nutritional properties.

Whipped margarine containing about 15 to 40% inert gas can be prepared by the method which comprises admixing liquid margarine with an inert gas in an amount sufficient to provide a finished composition containing about 15 to 40% gas by volume, cooling or chilling the admixture to a temperature of about 45° to 65° F., preferably about 55° to 60° F., at a pressure of about 40 to 300 p.s.i.g., preferably about 60 to 175 p.s.i.g.; agitating or working the chilled mass at a temperature of about 50° to 73° F., preferably about 55° to 70° F., at a pressure of about 40 to 400 p.s.i.g., preferably about 60 to 200 p.s.i.g. to produce a flowable mass or gel; and then releasing the pressure imposed on the flowable mass to atmospheric level prior to packaging the same. The expression "flowable" in this specification encompasses the term "pumpable" in referring to the superchilled mass before it is allowed to set up. Furthermore, in regard to "liquid margarine" it is intended to mean the emulsion of the melted fat and milk.

In another aspect, the present invention is concerned with a process which comprises subjecting liquid margarine with or without the hereinabove stated amount of inert gas in admixture therewith to a temperature of about 45° to 65° F., preferably about 55° to 60° F., at a pressure of about 40 to 300 p.s.i.g., preferably about 60 to 175 p.s.i.g.; working or agitating the chilled mass at a temperature of about 50° to 73° F., preferably about 55° to 70° F., at a pressure of about 40 to 400 p.s.i.g., preferably about 60 to 200 p.s.i.g. to produce a flowable gel or mass; chilling again the flowable mass or gel with agitation or working to a temperature of about 35° to 55° F., preferably about 42° to 48° F., at a pressure of about 1 to 300 p.s.i.g., preferably about 1 to 100 p.s.i.g.; and then, if the mass is not already at atmospheric pressure, the pressure on the flowable mass is released to atmospheric level prior to packaging the same. This product when pumped into a mold cavity lined with a wrapper sets up immediately, within a matter of seconds, and exhibits such strong cohesive forces that the wrapper strips readily from the print, leaving a smooth surface exposed.

The whipped margarine product of this invention possesses unique properties as evidenced by a comparison with conventional margarine materials. For some unexplainable reason, the presence of 15 to 40% finely and uniformly dispersed inert gas in margarine is the cause for this effect. The inert gas must be present in the margarine as a fine dispersion uniformly distributed throughout the material, otherwise the product is not suitable. Whipped margarines are very spreadable at low temperatures and have surprisingly good "stand up" qualities (firmness) at room temperatures, being quite resistant to "oiling off." On the other hand, conventional margarines or those containing less than 15% gas are not as resistant to oiling off. This is surprising since softer oil blends are preferred in making the whipped margarine of this invention. In general, whipped margarines of gas concentrations falling in the range of 15 to 40% by volume have similar characteristics, the only difference being that increased gas content results in larger volume of margarine per unit weight. From the standpoint of consumer appeal, it is preferred that the whipped margarine contain about 20 to 40% inert gas.

It is known that regular margarine is inferior to shortening in baking performance. Whipped margarine on the other hand is comparable to shortening in this respect. Conventional margarine spatters a great deal more in frying than the whipped margarine product of this invention. Another significant advantage in the whipped margarine over conventional margarine is the greater resistance to mold spoilage. This is even more surprising when it is realized that whipped margarine contains less salt for flavor consideration. In general, whipped margarine has better organoleptic qualities than conventional margarine.

The inert gas which is incorporated into the margarine material can be air, carbon dioxide, nitrogen, etc. The use of air requires that the margarine product be held in a refrigerated condition, whereas in the case of a nitrogen containing gas, e.g. a gas containing at least 70% nitrogen and not more than about 1% oxygen, the product is especially stable or resistant to mold growth without refrigeration. Whipped margarine containing nitrogen is vastly superior to conventional margarine in this respect. Carbon dioxide alone is preferably used when the whipped margarine is prepared at low pressures, that is, a pressure not exceeding about 100 p.s.i.g., and gas content in the final product is relatively low at about 15 to 20% by volume.

The oil composition to be used in the preparation of whipped margarine has a melting point of about 90° to 105° F., preferably about 92° to 98° F., and a setting point of about 71° to 82° F., preferably about 72° to 77° F. The most preferred oil composition has a melting point of about 93° to 95° F. and a setting point of about 73° to 75° F. Melting point is determined by the standard Wiley method and setting point is determined by the method described in U.S. Patent No. 2,047,530 of H. W. Vahlteich et al. issued to The Best Foods, Inc. It is preferred that the margarine product of this invention be made with a soft fat blend which it was heretofore thought to be undesirable for commercial production. For this purpose, the whipped margarine oil can contain 80 to 95% by weight of oil having a melting point of 96° F. and a setting point of 77° F. blended with 5 to 20% by weight of a limpid vegetable oil. The soft oil to be used for margarine production can be obtained by the hydrogenation of oil to a lesser degree than is practiced with regard to conventional margarine oils, or the conventional margarine oil can be blended with limpid or lightly hydrogenated oil. Other means for attaining the soft oil blends are illustrated by the examples in Table I hereinbelow. The surprising fact about using softer oils for the manufacture of whipped margarine is that even with its use the whipped margarine product is more stable to "oiling off" than conventional margarines in which the oil component has higher melting and setting points. Whipped margarine products made from soft oils have quick flavor release and thus less salt is used to avoid undue saltiness in flavor.

In the preparation of whipped margarine, the whole margarine in a liquid state is admixed with the inert gas prior to chilling or cooling.

Some prior workers who have used nitrogen in the preparation of conventional margarine maintain that the presence of gas during the chilling step is undesirable from the standpoint of heat transfer. For this reason, those skilled in the art have advocated adding the inert gas to the margarine after the cooling step. In contrast, in the present invention, encompassing whipped margarine of high gas content of 15 to 40% by volume, the inert gas must be added to the liquid margarine prior to the cooling step, otherwise the product is unduly porous. Also, should the fat constituent of the margarine be admixed with the inert gas and chilled before incorporating therein all the skim milk component, it is found that the resultant whipped margarine is grainy and exhibits moisture leakage so that this process is not suitable for this invention.

The liquid margarine, with or without inert gas, is first cooled to a temperature of about 45° to 65° F., preferably about 55° to 60° F. If the cooled margarine containing inert gas were to be packaged as a flowable gel without further treatment, the product in the cold state would have an objectionable firmness which cannot be corrected by tempering. Thus, it is essential that following the cooling step, the margarine, with or without inert gas, is agitated or worked at a temperature of 50° to 73° F., preferably 55° to 70° F. For the preparation of whipped margarine, the cooling step is conducted at a pressure of about 40 to 300 p.s.i.g., preferably about 60 to 175 p.s.i.g. The working step is conducted at a pressure of about 40 to 400 p.s.i.g., preferably about 60 to 200 p.s.i.g. The working step is essential in preparing a whipped margarine having the desirable characteristics mentioned hereinabove. The temperature at which the whipped margarine is worked has an important bearing upon its plasticity and porosity. It was found that preparing whipped margarine by the use of a temperature significantly above 73° F. during the working step results in a product which is unsuitable for this invention, being undesirably firm when chilled rapidly thereafter or undesirably soft and grainy when allowed to set up slowly with minimal refrigeration. It is also important that the pressure imposed on the flowable mass be released to atmospheric level prior to molding. By releasing the pressure before molding, the inert gas expands uniformly in the flowable mass, leaving a uniform and homogeneous molded product. Should the flowable mass be confined within the mold under positive pressure during the time of setting up, subsequent gas expansion varies from surface to the center of the molded product with the result that fracturing of the product occurs and variations in porosity and color are noted.

Whipped margarine which is made by the two-step process described above is allowed to set up in the container or wrapper prior to being handled. When the container has structural strength like a cardboard or plastic tub, it is more readily handled. To facilitate setting up of the wrapped product prior to cartoning, the wrapped prints of whipped margarine may be passed through a chilling or cooling compartment which is maintained at a temperature of 45° F. or less. This temperature treatment causes the print to become case hardened, and so it can be inserted into the carton without fear of damage. Another technique by which such whipped margarine can be packaged is to pass the workable mass, at a temperature in the lower range of that indicated in the working zone, through an orifice having the desired cross-section of a print, chilling the extruded solid product to obtain case hardening, cutting the extruded product to proper length, wrapping and then cartoning.

The method of this invention can be practiced by using a Votator such as is described in U.S. Patent No. 1,847,149. The Votator consists of a chilling "A" unit and a working "B" unit. The chilling "A" unit is essentially a small externally refrigerated cylinder through which the emulsion containing dispersed gas is continuously pumped. Sharp fast revolving scraper blades prevent the accumulation of a chilled solidified film on the cylinder walls. The emulsion leaves the chilling cylinders in a supercooled and highly fluid condition. The next step in the operation is to pass the supercooled emulsion into the working "B" unit. A suitable working "B" unit is described in the book by A. E. Bailey, "Industrial Oil and Fat Products," Interscience Publishers, Inc., New York, second edition, 1951, pages 921–2. The working "B" unit is equipped with a rotating shaft having projecting fingers. The fingers are positioned on the shaft in a spiral pattern to induce a helical movement of fat through the cylinders, and these fingers intermesh with similar stationary fingers which project from the cylinder wall. The "B" unit imparts work to the superchilled product while some crystallization takes place. During this treatment the temperature may rise as a result of heat of crystallization.

In the three-step process, it is contemplated subjecting the flowable mass being discharged from working "B" unit to additional chilling or cooling at a temperature of about 35° to 55° F., preferably about 42° to 48° F. The pressure of the third step is conducted at about 1 to 300 p.s.i.g. preferably 1 to 100 p.s.i.g. The third step involves chilling and working so that additional crystallization is effected while the solid fat material is broken up into smaller particle sizes to produce a material of desirable plasticity. In this step, agitation must be employed, otherwise the chilled mass will set up. As in the case of the two-step operation, the flowable mass leaving the third chilling step must be released of pressure prior to being molded for the same reasons given earlier. The product produced by the third step sets up in matters of seconds and for that reason manufacturing procedures are arranged to provide for continuous filling of molds. As a result of the temperature in the third step, the set up product has a temperature of about 43° to 58° F., preferably about 48° to 53° F. The pressure is at atmospheric level.

In the preparation of whipped margarine by the two-step process the flowable product mass can be discharged into a hopper for storage, the hopper being equipped with a slow moving sweep-type agitator. With the use of the hopper, the two-step process is generally conducted at a pressure not greater than about 200 p.s.i.g., more usually not greater than about 150 p.s.i.g. and preferably about 60 to 120 p.s.i.g. The temperatures are the same as those given hereinabove for the two-step process. At greater pressures there is a tendency for gas bubbles to join within the hopper and cause undesirable porosity of the product. This defect can be avoided by eliminating the hopper and molding the flowable mass directly according to the techniques described hereinabove. By the use of a hopper,

TABLE I

*Properties of the oils used in the manufacture of whipped margarine of the present invention*

| Example | Oil Component | Constants on Oil | | | Body Evaluations [1] | | |
|---|---|---|---|---|---|---|---|
| | | M. P., °F. | S. P., °F. | Iodine No. | 45° F. | 75° F. | 80° F. |
| Control | Regular margarine oil in regular margarine | 96.0 | 77.2 | 74.9 | 35 | 175 | 290 |
| 1 | Regular margarine oil in whipped margarine | 96.0 | 77.2 | 74.9 | 25 | 110 | 185 |
| 2 | 95 parts oil (Control)+5 parts limpid peanut oil (iodine no. 92) | 95.4 | 76.5 | 76.1 | 30 | 120 | 195 |
| 3 | 90 parts oil (Control)+10 parts limpid peanut oil | 94.4 | 75.2 | 77.0 | 40 | 140 | 210 |
| 4 | 85 parts oil (Control)+15 parts limpid peanut oil | 93.6 | 73.8 | 78.2 | 60 | 185 | 255 |
| 5 | 80 parts oil (Control)+20 parts limpid peanut oil | 93.0 | 73.0 | 79.0 | 75 | 210 | 300 |
| 6 | 70 parts (Control)+30 parts cottonseed oil of 85 iodine no.[2] | 95.0 | 75.2 | 77.9 | 40 | 150 | 225 |
| 7 | 60 parts (Control)+40 parts cottonseed oil of 85 iodine no.[2] | 94.0 | 74.8 | 78.8 | 60 | 170 | 265 |
| 8 | 50 parts (Control)+50 parts cottonseed oil of 85 iodine no.[2] | 93.1 | 73.2 | 79.9 | 70 | 220 | 300 |
| 9 | Margarine oil selectively hydrogenated to a lesser degree | 94.2 | 74.9 | 76.1 | 45 | 150 | 200 |
| 10 | do | 93.4 | 73.9 | 77.5 | 55 | 175 | 260 |
| 11 | do | 92.5 | 72.1 | 80.3 | 80 | 240 | 340 |
| 12 | Margarine oil selectively hydrogenated to a greater degree | 98.5 | 80.9 | 71.2 | 15 | 85 | 130 |
| 13 | 98 parts cottonseed oil of 85 iodine no.[2]+2 parts cottonseed oil of 5 iodine no.[3] | 98.1 | 72.8 | 83.4 | 100 | 340 | 390 |
| 14 | 90 parts cottonseed oil of 85 iodine no.[2]+10 parts of soy bean oil of 52 iodine no.[4] | 96.6 | 75.2 | 81.5 | 70 | 200 | 275 |
| 15 | 75 parts cottonseed oil of 85 iodine no.[2]+25 parts of soy bean oil of 68 iodine no.[5] | 103.5 | 76.5 | 80.2 | 80 | 195 | 305 |

[1] Penetration values (mm.×10) obtained on the resulting margarines when a standard needle is dropped on to the product at the temperatures indicated. The aluminum needle of 1/8 inch diameter, 7 inches in length, and weighing 3.695±0.005 grams, is dropped through a glass guide tube from a height of 25 cm.
[2] The cottonseed oil of 85 iodine number in Examples 6–8 and 13–15 is selectively hydrogenated; it has a melting point of about 90° F.
[3] Selectively hydrogenated to a melting point of about 140° F.
[4] Selectively hydrogenated to a melting point of about 120° F.
[5] Selectively hydrogenated to a melting point of about 110° F.
M.P. designates melting point, and S.P. setting point when measured by the methods previously referred to.

suitable whipped margarine products containing about 15 to 25% inert gas are obtained.

Shortenings containing dispersed inert gas of about 12% by volume have been prepared by others by a two-step process which appears to bear similarity to that herein described. When the gas content is increased to levels above 12%, viz. 15 to 40% by volume, in the manufacture of shortenings undesirable porosities are noted which cause rejection of such product. This experience has led those skilled in the art to refrain from increasing the gas content in shortenings above 12% and discouraged attempts to make a whipped margarine of the high gas content as described in this specification.

Having thus provided a description of my invention, for a fuller understanding references will be made to specific examples thereof.

Several tests were performed on preparing whipped margarine and these are given in Table I.

All of the whipped margarines described in Table I above were subjected to the same degree of working and other identical operating conditions of the process of the invention, prior to the packaging of the product. All of the whipped products were prepared to contain about 20 percent added nitrogen or carbon dioxide gas on a volume basis.

The penetration values, or body evaluations, described in Table I, reflect the softness of the product at various temperatures. The higher the penetration value at 45° F. (typical refrigeration temperature) the more desirable is the product, provided there is no great sacrifice in the body of the margarine at 80° F. Under the conditions of the test a penetration value of less than 30 for a product at 45° F. is undesirable, since the margarine is crumbly and poorly spreadable at that temperature. A penetration value of more than 300 for a product at 80° F. is undesirable since the margarine is too soft; becoming comparable in consistency to a mayonnaise. It is desirable that the margarine product, when used as a bread spread, have excellent spreadability both at refrigeration temperature and room temperature.

It will be noted in Table I above (compare the control with Example 1) that, in making a whipped margarine from regular margarine oil, greater firmness of product is obtained throughout the temperature range of interest. The product is poorly spreadable in the cold but more acceptable than regular margarine at 75°–80° F. Such a product is highly desirable when the margarine is to be stored at room temperature, which is very often the case. Indeed, a firm whipped margarine, such as that of Example 12, is acceptable as a product which is to be marketed in the absence of refrigeration, such as the margarine marketed to the baking trade. The results shown in Table I indicate that improved spreadability in the cold can be obtained by using a softer oil (oils hydrogenated to a lesser degree used as such or components of blends). In making a whipped margarine without sacrificing desirable body characteristics at the higher temperatures, I have found that a blend of 10 to 15% by weight of limpid peanut oil with 85 to 90% by weight of regular margarine oil yields whipped margarine of improved spreadability in the cold and improved firmness at the elevated temperatures (compare Example 3 and 4 with the control). The blend with five parts of limpid peanut oil still yields an acceptable product with respect to spreadability in the cold, but also one definitely superior at the elevated temperatures (compare Example 2 with the control). The blend with twenty parts of limpid peanut oil yields a markedly superior product with respect to spreadability in the cold and one still acceptable at the elevated temperatures (compare Example 5 with the control). Such a product, and even that shown in Example 11, is excellent when the product is continually stored at refrigeration temperatures. Illustrations of equivalents in oil compositions are shown in Table I; Examples 3, 6 and 9 form one group; Examples 5 and 8 another group; and Examples 4, 7 and 10 are regarded as equivalent within another group.

The oil formulations in Examples 13 to 15 differ from those in the preceding examples in having a much higher melting point and a much higher iodine value in relation to setting point. The very high iodine value in relation to melting point in Examples 13 to 15 is particularly worthy of note. These constants are obtained when a very soft fat is blended with a relatively small amount of a highly hydrogenated fat. When the oils of Examples 13 to 15 are used to make whipped margarines, according to the methods to be described, products are obtained which are very spreadable in the cold, soft at room temperature and 80° F., but still resistant to "oiling off." Such whipped margarines are ideal for sale and use as refrigerated products.

The superior creaming performance of whipped margarine is shown in Table II below.

TABLE II

*Superior creaming performance of whipped margarine of the present invention reflecting improved baking performance* [1]

| Example | Identity | Time of Creaming, min. | Specific Volume of Mix |
|---|---|---|---|
| Control A | Regular margarine oil in regular margarine. | 20 | 1.35 |
| | | 40 | 2.12 |
| | | 60 | 2.52 |
| Control B | Regular shortening oil [2] in regular shortening. | 20 | 2.39 |
| | | 40 | 2.73 |
| | | 60 | 2.98 |
| 1 | Regular margarine oil in whipped margarine. | 20 | 2.33 |
| | | 40 | 2.77 |
| | | 60 | 2.96 |
| 3 | 90 parts oil (Control)+10 parts limpid peanut oil. | 20 | 2.26 |
| | | 40 | 2.63 |
| | | 60 | 2.86 |
| 8 | 50 parts oil (Control)+50 parts cottonseed oil of 85 iodine number.[3] | 20 | 2.30 |
| | | 40 | 2.65 |
| | | 60 | 2.66 |

[1] A mixture of 130 grams of flour plus 680 grams of the test product was stirred at 72° F. at medium speed with the paddle agitator in a 10-quart bowl of a Hobart mixer. The latter was jacketed and maintained at 72° F. by running water.
[2] Melting point of 107.1° F.; setting point of 82.4° F.; iodine number of 72.5.
[3] Selectively hydrogenated.
Examples 1, 3 and 8 are the same products described in Table I above.

When the results obtained for control A and control B in Table II are compared, it is apparent that the latter (the shortening) creams (absorbs air) at a rate somewhat more than two times that of regular margarine. This comparison is based upon the specific volume of control B after twenty minutes creaming with that of control A after forty minutes of creaming. The results obtained also show that whipped margarine, made with a regular margarine oil, creams as well as shortening (compare Example 1 with control B). This result was surprising. That the whipped margarines of the present invention made with regular margarine oil blended with limpid, or lightly, hydrogenated oils, cream almost as well as a shortening (compare Examples 3 and 8 with control B), and about twice as well as does regular margarine (compare with control A), was totally unexpected. The values for the whipped margarines after twenty minutes are the same obtained after creaming regular margarine for forty minutes. It is the ease with which fats cream to an increased volume during an early period of mixing which is of primary interest to the baker. The 60-minute values reflect the ability of the fat products to absorb punishment during extending mixing without a collapse in the aerated mass. Even here, the whipped margarines containing more limpid oil (Examples 3 and 8) exhibit physical stability at least equal to, if not superior to, regular margarine.

In another series of experiments, whipped margarine was prepared by different methods than described above. The basic formulation in these runs is given below.

| Ingredients | Parts by Weight |
|---|---|
| Hydrogenated Cottonseed Oil, M.P.=96° F., S.P.=76° F. | 75.8 |
| Liquid Peanut Oil | 4.0 |
| Lecithin | 0.13 |
| Monoglycerides | 0.13 |
| Pasteurized Skim Milk | 17.3 |
| Salt | 2.6 |
| Vitamin A (500,000 USP units/gm.) | 0.0054 |
| Carotene (400,000 USP units/gm.) | 0.0027 |

In all runs the emulsion or margarine was introduced into the Votator at 100° F. Gas was injected into the emulsion prior to entering the first chilling A unit.

The operating conditions in the Votator are given below.

| Run No. | Flow Sequence I | Gas | Vol. Percent Gas II | 1st A Unit, °F. | Working B Unit, °F. | 2nd A Unit, °F. | Product Temperature, °F. | Pressure in Votator, p.s.i.g.III |
|---|---|---|---|---|---|---|---|---|
| 1 | P-A-B-P-A¹-E | N₂ | 30 | 50 | 56 | 48 | 53 | 80 |
| 2 | P-A-B-P-A¹-E | N₂ | 30 | 55 | 58 | 48 | 52 | 30 |
| 3 | P-A-B-P-A¹-E | N₂ | 33 | 50 | 56 | 48 | 53 | 80 |
| 4 | P-A-B-P-A¹-E | N₂ | 35 | 55 | 58 | 48 | 53 | 30 |
| 5 | P-A-B-P-A¹-E | N₂ | 30 | 46 | 56 | 46 | 52 | 250 |
| 6 | P-A-P-B-E | N₂ | 30 | 58 | 67 | | 72 | 60 |

I P=pump, A=chilling "A" unit, B=working unit, A¹=2nd chilling "A" unit, and E=extrusion valve.
II In final product.
III Prior to extrusion valve.

The appearances of the products obtained in these runs following the spout filling of mold cavities lined with the wrapper are tabulated below.

| Run No. | Appearance after fill |
|---|---|
| 1 | No visually detectable porosity, no expansion, and firm enough to handle within five seconds. |
| 2 | Do. |
| 3 | Do. |
| 4 | Very slight porosity, no expansion, and firm enough to handle within five seconds. |
| 5 | Slight porosity, some expansion, and firm enough to handle within five seconds. |
| 6 ¹ | Slight porosity, slight expansion and soft. |

¹ Following refrigeration, the print becomes hard enough to handle.

The prints of whipped margarine were stored at 75° F. for 6 and 72 hours. The results are given below.

| Run No. | Storage at 75° F. | |
|---|---|---|
| | 6 Hr. | 72 Hr. |
| 1 | Very slight porosity—acceptable. | Very slight porosity—acceptable. |
| 2 | Very good; no visually detectable porosity. | Very good; no visually detectable porosity. |
| 3 | Slight porosity—acceptable. | Slight porosity—acceptable. |
| 4 | Do. | Do. |
| 5 | Acceptable (Refrigerated). | Acceptable (Refrigerated). |
| 6 | Slight porosity—acceptable. | Slight porosity—acceptable. |

From the above experiments it is apparent that satisfactory products containing more than 25% gas by volume can be obtained by the two-step or three-step process, that the three-step process is preferred because of the rapidity with which the molded product sets up for easy handling, and that low pressures are preferred in making products of less readily detectable porosity.

Having thus provided a written description of my invention along with specific examples thereof, it should be understood that no undue restrictions or limitations are to be imposed by reason thereof, but that the present invention is defined by the appended claims.

I claim:

1. A whipped margarine comprising about 15 to 40% inert gas by volume uniformly and finely dispersed in margarine the entire oil composition of said margarine having a melting point of about 90° to 105° F. and a setting point of about 71° to 82° F.

2. A whipped margarine comprising about 15 to 40% of a nitrogen containing gas by volume uniformly and finely dispersed in margarine the entire composition of said margarine having a melting point of about 90° to 105° F. and a setting point of about 71° to 82° F.

3. A whipped margarine according to claim 1 comprising about 24 to 40% inert gas by volume uniformly and finely dispersed in margarine.

4. A process which comprises combining an entire feed of liquid margarine with an inert gas in an amount sufficient to provide a finished composition containing about 15 to about 40% inert gas by volume the entire oil composition of said margarine having a melting point of about 90 to 105° F. and a setting point of about 71 to 82° F., cooling the admixture to a temperature of about 45° to 65° F. and at a pressure of about 40 to 300 p.s.i.g., agitating the cooled admixture at a temperature of about 50° to 73° F. and at a pressure of about 40 to 400 p.s.i.g. to produce a flowable mass, and then releasing the pressure on the flowable mass to atmospheric level prior to packaging the same.

5. A process which comprises combining an inert gas with an entire feed of liquid margarine in an amount sufficient to provide a finished composition containing about 15 to 40% inert gas by volume the entire oil composition of said margarine having a melting point of about 90 to 105° F. and a setting point of about 71 to 82° F., cooling the admixture to a temperature of about 45° to 65° F. and at a pressure of about 40 to 300 p.s.i.g., agitating the cooled mass at a temperature of about 50° to 73° F. and at a pressure of about 40 to 400 p.s.i.g. to produce a flowable mass, cooling and agitating the flowable mass to a temperature of about 35° to 55° F. and at a pressure of about 1 to 300 p.s.i.g. to maintain the mass flowable, and then releasing any pressure on the flowable mass to atmospheric level during filling of a molding zone.

6. The process of claim 4 wherein the inert gas is a nitrogen containing gas.

7. The process of claim 5 wherein the inert gas is a nitrogen containing gas.

8. A process which comprises admixing an inert gas with an entire feed of liquid margarine in an amount sufficient to provide a finished composition containing about 15 to 40% inert gas, the entire oil composition of said margarine having a melting point of about 90 to 105° F. and a setting point of about 71 to 82° F., cooling the admixture to a temperature of about 55° to 60° F. and at a pressure of about 60 to 175 p.s.i.g., agitating the cooled mass at a temperature of about 55° to 70° F. and at a pressure of about 60 to 200 p.s.i.g. to produce a flowable mass, and then releasing the pressure on the flowable mass to atmospheric level prior to packaging the same.

9. A process which comprises admixing an inert gas with an entire feed of liquid margarine in an amount sufficient to provide a finished composition containing about 15 to 40% inert gas the entire oil composition of said margarine having a melting point of about 92 to 105° F. and a setting point of about 71 to 82° F., cooling the admixture to a temperature of about 55° to 60°

F. and at a pressure of about 60 to 175 p.s.i.g., agitating the cooled mass at a temperature of about 55° to 70° F. and at a pressure of about 60 to 200 p.s.i.g. to produce a flowable mass, cooling and agitating the flowable mass at a temperature of about 42 to 48° F. and at a pressure of about 1 to 100 p.s.i.g. to maintain the mass flowable, and then releasing any pressure on the flowable mass to atmospheric level during filling of a molding zone.

10. A process which comprises admixing an inert gas with an entire feed of liquid margarine in an amount sufficient to provide a finished composition containing about 15 to 25% inert gas the entire oil composition of said margarine having a melting point of about 90 to 105° F. and a setting point of about 71 to 82° F., cooling the admixture to a temperature of about 45° to 65° F. and at a pressure of about 60 to 200 p.s.i.g., agitating the cooled admixture at a temperature of about 50° to 73° F. and at a pressure of about 60 to 200 p.s.ig. to produce a flowable mass, passing the flowable mass into a hopper with simultaneous release of the pressure on the flowable mass to atmospheric level.

11. The process of claim 10 wherein the pressure for cooling and agitation is about 60 to 120 p.s.i.g.

12. The process of claim 5 wherein inert gas is added in an amount to provide a finished composition containing about 20 to 40% inert gas.

13. A process which comprises admixing a nitrogen containing gas with an entire feed of liquid margarine the entire oil composition of said margarine having a melting point of about 92° to 98° F and a setting point of about 72° to 77° F. in an amount sufficient to provide a finished composition containing by volume about 15 to 40% gas, cooling the admixture to a temperature of about 55° to 60° F. and at a pressure of about 60 to 175 p.s.i.g., agitating the cooled admixture at a temperature of about 55° to 70° F. and at a pressure of about 60 to 200 p.s.i.g. to produce a flowable mass, and releasing the pressure on the flowable mass to atmospheric lever in a storage hopper prior to packing the same.

14. A process which comprises admixing a nitrogen containing gas with an entire feed of liquid margarine the entire oil composition of said margarine having a melting point of about 92° to 98° F. and a setting point of about 72° to 77° F. in an amount sufficient to provide a finished composition containing about 15 to 40% gas, cooling the admixture to a temperature of about 55° to 60° F. and at a pressure of about 60 to 175 p.s.i.g., agitating the cooled admixture at a temperature of about 55° to 70° F. and at a pressure of about 60 to 200 p.s.i.g. to produce a flowable mass, cooling and agitating the flowable mass at a temperature of about 42° to 48° F. and at a pressure of about 1 to 100 p.s.i.g. to maintain the mass flowable, and then releasing any pressure on the flowable mass to atmospheric level during filling of a molding zone.

15. The composition of claim 1 being further characterized by having a penetration value of from about 15 to 100 at 45° F. and from about 130 to 390 at 80° F.

16. The composition of claim 1 being further characterized by having a penetration value of from about 30 to 100 at 45° F. and from about 130 to 300 at 80° F.

17. A whipped margarine comprising about 15 to 40% inert gas by volume uniformly and finely dispersed in margarine, the entire oil composition of said margarine having a melting point of about 92 to 98° F. and a setting point of about 72 to 77° F.

18. A whipped margarine comprising about 15 to 40% inert gas by volume uniformly and finely dispersed in margarine, the entire oil composition of said margarine is a blend consisting of about 80 to 95% of an oil having a melting point of 96° F. and a setting point of 77° F. with about 5 to 20% limpid vegetable oil.

References Cited in the file of this patent

UNITED STATES PATENTS

| | | |
|---|---|---|
| 2,047,530 | Vahlteich et al. | July 14, 1936 |
| 2,357,896 | Howe | Sept. 12, 1944 |
| 2,772,976 | Schmidt et al. | Dec. 4, 1956 |

FOREIGN PATENTS

| | | |
|---|---|---|
| 808,829 | Germany | July 19, 1951 |

UNITED STATES PATENT OFFICE
CERTIFICATION OF CORRECTION

Patent No. 2,970,917                                    February 7, 1961

Daniel Melnick

It is hereby certified that error appears in the above numbered patent requiring correction and that the said Letters Patent should read as corrected below.

Column 1, line 36, for "advise" read -- advised --; column 2, line 26, for "break" read -- bread --; column 10, line 5, after "entire" insert -- oil --; column 11, line 40, for "lever" read -- level --; same line 40, for "packing" read -- packaging --.

Signed and sealed this 11th day of July 1961.

(SEAL)
Attest:

ERNEST W. SWIDER
Attesting Officer

DAVID L. LADD
Commissioner of Patents